March 21, 1950     H. S. GOETZ     2,501,273
AUTOMOBILE COOLER AND SUPPORT

Filed May 9, 1946

INVENTOR.
*H. S. Goetz*
BY
*Wilkinson & Mawhinney*
Attorneys

Patented Mar. 21, 1950

2,501,273

UNITED STATES PATENT OFFICE 2,501,273

AUTOMOBILE COOLER AND SUPPORT

Harry S. Goetz, San Bernardino, Calif.

Application May 9, 1946, Serial No. 668,598

4 Claims. (Cl. 98—2)

The present invention relates to improvements in coolers for automobiles and supports therefor, and has for an object to provide an improved cooling unit and hanger for supporting such unit upon the door of an automobile or other vehicle or upon any suitable support.

Another object of the invention is to provide an improved automobile cooler and support in which the latter may be adjusted as to width to enable the cooler to be supported in a hanging position from the door of the automobile when the window glass is in the lowered position.

A still further object of the invention resides in providing an improved cooler and integrated support in which clamp members cooperate with the peculiar wall construction of the cooling unit in a manner to form a unitary support contained within the conventional outline of the cooling unit to the end that a simplified construction and unobtrusive hanger may be provided.

With the foregoing and other objects in view the invention will be more fully described hereinafter and more particularly pointed out in the appended claims.

In the drawings, in which like reference characters denote like parts throughout the several views.

Figure 1:
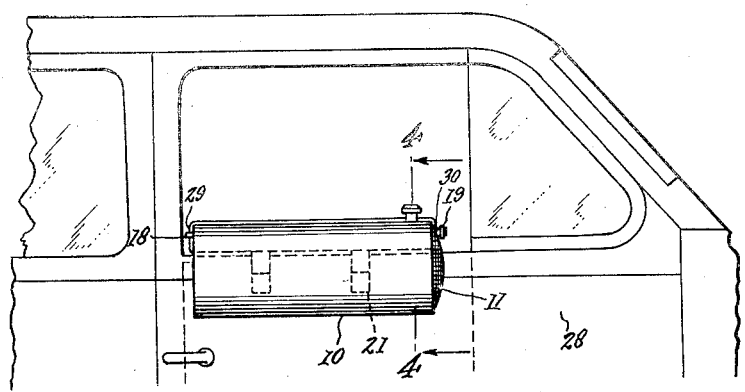
Figure 1 is a fragmentary side elevational view of an automobile shown equipped with an improved cooler and support constructed according to the present invention.
Figure 2:
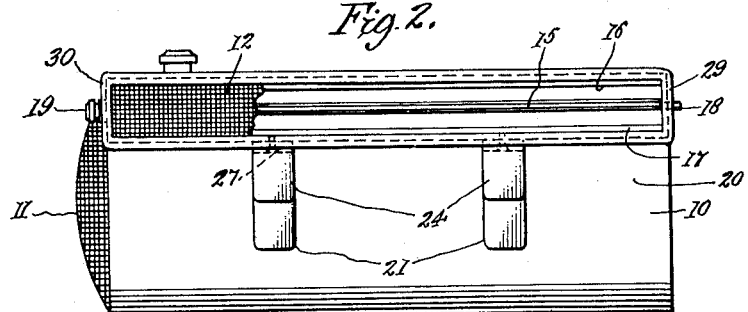
Figure 2 is a side elevation, taken on an enlarged scale, of the cooling unit and support apart from the vehicle and from the side opposite that illustrated in Figure 1.
Figure 3:
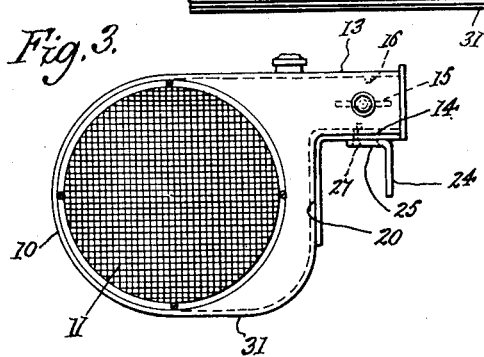
Figure 3 is an end elevation of the combined cooling unit and support taken from the left end of Figure 2.

Referring more particularly to the drawings, 10 designates the virtually cylindrical cooler casing which contains the cooling equipment of any suitable conventional form. In one end of the casing 10 (the forwardly directed end) is the screened air intake 11 while at the side thereof is the screened cool air outlet to the interior of the automobile.

The outlet is in the form of an elongated duct of rectangular section extending from one side of the casing and in communication with the upper portion of the casing. The top wall of the outlet is the wall 13 constituting a tangential extension of the casing whereas the lower wall of the outlet is the offset wall 14 connected to a substantially vertical and plane wall portion 20 which connects with wall 31 extending tangentially from the bottom portion of the casing. The substantially circular inlet is in the forward wall of the casing, the rear wall being closed. In the longitudinally extending side outlet is a damper 15 adapted to close against stops 16 and 17 on the walls 13 and 14; the damper 15 being affixed to a rock shaft journaled in the end walls 29 and 30 of the outlet offset of the casing. An end of the shaft 18 projects from the forward end wall 30 and carries an operating knob 19 which is accessible from the interior of the automobile. The bearings of the shaft 18 in the end walls 29 and 30 will be frictional whereby the damper 15 will be retained in any angularly set position.

Figure 4:
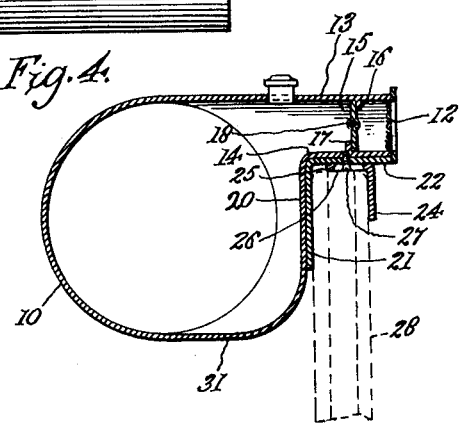
Figure 4 is a transverse section taken on the line 4—4 of Figure 1.
Figure 5:
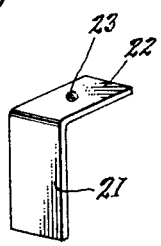
Figure 5 is a perspective view of the fixed clamp member.

As shown more particularly in Figures 4 and 5, a vertical leg 21 of a fixed hanger bracket is placed alongside the wall 20 with the horizontal leg 22 of the bracket contacting the under side of the bottom offset wall 14. The bracket legs may be secured to the walls 20 and 14 by brazing, welding, soldering, by the use of fastenings or in any desired manner. In the horizontal leg 22 is a tapped hole 23.

Figure 6:
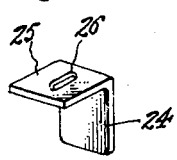
Figure 6 is a similar view of the companion adjustable clamp member.

An adjustable hanger bracket is shown in Figures 4 and 6 as composed of a vertical leg 24 and a horizontal leg 25. In the horizontal leg 25 is an elongated slot 26 the lower side of which is formed with a counterbore to receive the head of a screw 27 in a flush manner. The threads of the screw are engaged with the threads of the tapped hole 23 in the stationary bracket.

As shown at 28 in dotted lines in Figure 4 is an automobile door over which the device is adapted to be hung.

In the use of the device, the neck or offset air outlet 13, 14 is adapted to extend through the open window into the interior of the vehicle into which the cooled air may be directed in a volume as controlled by the damper 15. The cylindrical main casing 10 is supported exteriorly of the vehicle while the support upon the vehicle door 28 is contributed to by the outlet neck 13, 14 and the peculiarly shaped cooperating bracket 21, 24. It will be noted that the vertical leg 21 of the stationary bracket engages the outside surface of the vehicle door and that it is longer than the corresponding vertical leg 24 of the adjustable bracket. This differential in length enables the unit and its hanger to be more readily assembled to the car door from a position externally of the vehicle in that the shorter leg or flange 24 is that required to pass over the top of the door 28 and therefore it is desirable that this leg 24 be not unduly deep in a vertical direction. However the vertical leg 21 of the external fixed bracket does not have to clear the top of the door and hence it may be longer to provide greater surface area to sustain the weight of the cooler unit 10 inasmuch as the center of gravity of such unit is far outside the plane of the door 28 and therefore the weight tends to sag in the direction of the longer leg 21; hence the greater area of purchase against the door to counteract any tendency to a turning moment in the entire unit about its support upon the upper portion of the door.

The legs 21 and 22 of the fixed bracket are reinforced and strengthened by the walls 20 and 14 of the offset portion of the cooling unit. In the same way the horizontal leg 25 of the adjustable inner bracket is reinforced by the superimposed leg 22 and wall 14. Thus the bracket members while apparently slender and small are well reinforced to perform their functions as the hanger members. By the employment of two or more such hanger members an adequate support is provided for the cooling unit upon the car door. The unit is carried in such way that the entrance 11 is forward to take advantage of the natural draft of air created by the motion of the vehicle. Since the air inlet 11 points forward (in the direction of movement of the vehicle), air enters the inlet readily and passes through the cooling means within the casing before being regulatably discharged into the vehicle through the narrow, elongated and offset outlet. The cooling equipment within the casing may be of any conventional form, such as porous, water-wetted partitions, cylinders, wicks, etc., means being provided in the top of the casing for the periodic introduction of water. The incoming air passes through the cooling partitions before reaching the outlet. In practice, when a vehicle is traveling, air is scooped into the casing and is discharged into the vehicle at an appreciable pressure, displacing a large proportion of the warm air in such vehicle, the displaced air leaving through the open window above the outlet from the casing. Circulation is thus established within the vehicle and since the incoming air is much cooler, the vehicle is cooled effectively.

The hanger may be adjusted as to width by loosening the screw 27 and shifting the inner bracket in and out which is permitted by the direction of elongation of the slot 26. When the required width is arrived at the screw 27 is retightened and the device placed upon the door. In use the heads of the screws 27 and in fact the entire screws are concealed. Factually the entire bracket arrangement is concealed and only the external walls of the cooling device are apparent. The adjustable clamp or bracket may be so adjusted that the vertical leg 24 will slip inside the door on the outside of the glass when the glass is down.

The adjustment is made before the cooler is applied to the vehicle. After such adjustment it is only necessary to hang the device upon the car door and to lift it off such door when its use is no longer required.

It is obvious that various changes and modifications may be made in the details of construction and design of the above specifically described embodiment of this invention without departing from the spirit thereof, such changes and modifications being restricted only by the scope of the following claims.

I claim:

1. A removable cooler for automobiles comprising: an enlarged, longitudinally extending casing closed at one end and provided with an air inlet in the other end, said casing including a vertical side wall section provided with a horizontally extending lip and a horizontally extending top wall section vertically spaced from said lip and extending laterally beyond said side wall to form with said lip an outlet conduit in communication with the upper portion of the casing, said conduit having a longitudinally extending port, and a pair of longitudinally spaced L-shaped brackets adjustably positionable on the lower face of said lip, each of said brackets including a leg lying in a plane parallel to the vertical side wall of the casing and arranged to cooperate therewith to grasp the side wall of a vehicle, each of said brackets including a leg disposed perpendicularly to the first mentioned leg and having an elongated laterally disposed slot, and a securing member extending vertically through the slot and fixedly secured to said lip.

2. An improved automobile cooler and support comprising an enlarged casing closed at one end and having an air inlet in the other end and a lateral offset having an outlet and constructed and arranged to project over the lower edge of the window of a vehicle door, a fixed bracket member permanently secured to said offset and casing and provided with a horizontal leg and a vertical leg and an adjustable bracket member having a horizontal leg adjustably connected with the horizontal leg of said fixed bracket member, said adjustable bracket having a vertical leg spaced from the fixed bracket and shorter than the vertical leg of said fixed bracket, said vertical leg of the adjustable bracket and the fixed bracket member extending downwardly in vertically opposed relationship from the lateral offset.

3. An improved automobile cooler and support comprising a casing having one closed end, an air intake port in the other end and an offset portion in communication with the upper portion of the casing and terminating in a cooled air outlet, said offset portion having angled walls, one of which is adapted to extend alongside a vehicle door while the other extends across the lower part of the window into the vehicle, and an adjustable hanger concealed beneath said offset portion and air outlet and affixed to said angled walls, said hanger including a vertical leg and a horizontal leg having a laterally elongated slot beneath said offset portion whereby the angled walls and hanger may be adjusted into close embracement of top marginal portions of the vehicle door beneath the window; and means passing through said slot for holding said adjustable hanger in selected position with respect to said angled walls.

4. The combination of claim 3 characterized by the fact that the hanger is composed of fixed and adjustable brackets with the adjustable bracket toward the inside of the vehicle and wherein the vertical leg is of relatively small vertical height and is spaced from the fixed bracket.

HARRY S. GOETZ.

REFERENCES CITED

The following references are of record in the file of this patent:

UNITED STATES PATENTS

| Number | Name | Date |
| --- | --- | --- |
| 1,518,715 | Walker | Dec. 9, 1924 |
| 1,718,083 | Segelken | June 18, 1929 |
| 1,750,789 | Thompson | Mar. 18, 1930 |
| 1,992,413 | Callahan | Feb. 26, 1935 |
| 2,230,020 | Webster | Jan. 28, 1941 |
| 2,251,511 | Burke | Aug. 5, 1941 |
| 2,294,664 | Hubbard | Sept. 1, 1942 |